(12) United States Patent
Zhao et al.

(10) Patent No.: US 11,496,185 B2
(45) Date of Patent: Nov. 8, 2022

(54) METHODS AND DEVICES FOR WIRELESS CHARGING

(71) Applicants: STMicroelectronics Asia Pacific Pte Ltd., Singapore (SG); STMicroelectronics (Shenzhen) R&D Co. Ltd., Shenzhen (CN)

(72) Inventors: Wenhe Zhao, Singapore (SG); Jiasheng Wang, Shenzhen (CN)

(73) Assignees: STMicroelectronics (Research & Development Limited), Shenzhen (CN); STMicroelectronics Asia Pacific PTE Ltd., Singapore (SG)

( * ) Notice: Subject to any disclaimer, the term of this patent is extended or adjusted under 35 U.S.C. 154(b) by 42 days.

(21) Appl. No.: 17/024,270

(22) Filed: Sep. 17, 2020

(65) Prior Publication Data
US 2022/0085848 A1    Mar. 17, 2022

(51) Int. Cl.
*H02J 50/80* (2016.01)
*H04B 5/00* (2006.01)
*H02J 50/12* (2016.01)

(52) U.S. Cl.
CPC ............ *H04B 5/0075* (2013.01); *H02J 50/12* (2016.02); *H02J 50/80* (2016.02); *H04B 5/0037* (2013.01)

(58) Field of Classification Search
CPC ..... H04B 5/0075; H04B 5/0037; H02J 50/12; H02J 50/80; H04L 27/02
See application file for complete search history.

(56) References Cited

U.S. PATENT DOCUMENTS

| | | | |
|---|---|---|---|
| 6,470,045 B1 * | 10/2002 | Fuentes | H04L 69/324 375/220 |
| 9,843,202 B2 | 12/2017 | Kdoshim et al. | |
| 9,960,643 B2 | 5/2018 | Gao et al. | |
| 9,985,695 B2 | 5/2018 | Won et al. | |
| 2009/0305735 A1 * | 12/2009 | Sasaki | H04L 1/0026 455/522 |
| 2011/0163608 A1 * | 7/2011 | Brohlin | H02J 7/045 307/104 |

(Continued)

FOREIGN PATENT DOCUMENTS

WO    WO-2021244086 A1 *   12/2021

OTHER PUBLICATIONS

Gao, Xiang, "Demodulating Communication Signals of Qi-Compliant Low-Power Wireless Charger Using MC56F8006 DSC," Freescale Semiconductor Application Note, Document No. AN4701, Rev. O, Mar. 2013, 21 pages.

*Primary Examiner* — Pinping Sun
(74) *Attorney, Agent, or Firm* — Slater Matsil, LLP

(57) ABSTRACT

A method for modulating a signal including operating a circuit in a first arrangement during a first operating interval and switching the circuit between the first arrangement and a second arrangement during a first modulation interval to vary a load on the circuit to produce a first amplitude shift keying (ASK) signal. The method further includes detecting a voltage on the circuit crossing a threshold level and operating the circuit in the second arrangement during a second operating interval. The method also includes switching the circuit between the second arrangement and the first arrangement during a second modulation interval to vary the load on the circuit to produce a second ASK signal.

25 Claims, 14 Drawing Sheets

(56) References Cited

U.S. PATENT DOCUMENTS

| | | | |
|---|---|---|---|
| 2013/0093256 A1* | 4/2013 | Choi | H02J 50/80 |
| | | | 307/104 |
| 2015/0154486 A1* | 6/2015 | McFarthing | G06K 19/0715 |
| | | | 235/492 |
| 2015/0340880 A1* | 11/2015 | Kdoshim | H02J 50/10 |
| | | | 307/104 |
| 2017/0070082 A1* | 3/2017 | Zheng | H02M 3/156 |
| 2018/0131234 A1* | 5/2018 | Uchimoto | G05F 1/46 |

* cited by examiner

1300

Operate a circuit in a first arrangement during a first operating interval
1302

↓

Switch the circuit between the first arrangement and a second arrangement during a first modulation interval to vary a load on the circuit to produce a first amplitude shift keyed (ASK) signal wherein switching the circuit from the first arrangement to the second arrangement increases the voltage on the circuit across the load
1304

↓

Detect a voltage on the circuit exceeding a threshold level
1306

↓

Operate the circuit in the second arrangement during a second operating interval
1308

↓

Switch the circuit between the second arrangement and the first arrangement during a second modulation interval to vary the load on the circuit to produce a second ASK signal wherein switching the circuit from the second arrangement to the first arrangement decreases the voltage on the circuit across the load.
1310

```
┌─────────────────────────────────────────────────────────────────┐
│ Operate a circuit in a first arrangement during a first operating interval │
│                              1402                                │
└─────────────────────────────────────────────────────────────────┘
                                  ↓
┌─────────────────────────────────────────────────────────────────┐
│ Switch the circuit between the first arrangement and a second arrangement │
│ during a first modulation interval to vary a load on the circuit to produce a │
│ first amplitude shift keyed (ASK) signal wherein switching the circuit from the │
│ first arrangement to the second arrangement decreases the voltage on the │
│                    circuit across the load l                     │
│                              1404                                │
└─────────────────────────────────────────────────────────────────┘
                                  ↓
┌─────────────────────────────────────────────────────────────────┐
│    Detect a voltage on the circuit falling below a threshold level    │
│                              1406                                │
└─────────────────────────────────────────────────────────────────┘
                                  ↓
┌─────────────────────────────────────────────────────────────────┐
│  Operate the circuit in the second arrangement during a second operating │
│                             interval                             │
│                              1408                                │
└─────────────────────────────────────────────────────────────────┘
                                  ↓
┌─────────────────────────────────────────────────────────────────┐
│ Switch the circuit between the second arrangement and the first arrangement │
│ during a second modulation interval to vary the load on the circuit to produce │
│    a second ASK signal wherein switching the circuit from the second │
│ arrangement to the first arrangement increases the voltage on the circuit │
│                         across the load.                         │
│                              1410                                │
└─────────────────────────────────────────────────────────────────┘
```

FIG. 14

METHODS AND DEVICES FOR WIRELESS CHARGING

TECHNICAL FIELD

The present invention relates to methods and devices for wireless charging.

BACKGROUND

Wireless charging is becoming a preferred means to charge many electronic devices including, but not limited to, mobile phones, smart watches, and tablets. A power-receiving device is wirelessly coupled with a power-transmitting device. During the power transfer, communication between the power-receiving device and the power-transmitting device may be necessary. Communication may be achieved by varying a load of a receiving circuit of the power-receiving device to produce an Amplitude Shift Keying (ASK) signal. But, this may increase the voltage of the receiving circuit to undesirably high levels, or decrease the voltage to undesirably low levels.

SUMMARY

In accordance with an embodiment of the present invention a method for modulating a signal includes operating a circuit in a first arrangement during a first operating interval and switching the circuit between the first arrangement and a second arrangement during a first modulation interval to vary a load on the circuit to produce a first amplitude shift keying (ASK) signal. The method may further include: detecting a voltage on the circuit crossing a threshold level; operating the circuit in the second arrangement during a second operating interval; and switching the circuit between the second arrangement and the first arrangement during a second modulation interval to vary the load on the circuit to produce a second ASK signal.

In accordance with an embodiment of the present invention a method for modulating a signal includes operating a circuit in a first arrangement during a first operating interval and switching the circuit between the first arrangement and a second arrangement during a first modulation interval to vary a load on the circuit to produce a first amplitude shift keying (ASK) signal where switching the circuit from the first arrangement to the second arrangement increases a voltage on the circuit across the load. The method further includes: detecting a voltage on the circuit exceeding a threshold level; operating the circuit in the second arrangement during a second operating interval; and switching the circuit between the second arrangement and the first arrangement during a second modulation interval to vary the load on the circuit to produce a second ASK signal where switching the circuit from the second arrangement to the first arrangement decreases the voltage on the circuit across the load.

In accordance with an embodiment of the present invention a method for modulating a signal includes operating a circuit in a first arrangement during a first operating interval and switching the circuit between the first arrangement and a second arrangement during a first modulation interval to vary a load on the circuit to produce a first amplitude shift keying (ASK) signal where switching the circuit from the first arrangement to the second arrangement decreases a voltage on the circuit across the load. The method further includes: detecting a voltage on the circuit falling below a threshold level; operating the circuit in the second arrangement during a second operating interval; and switching the circuit between the second arrangement and the first arrangement during a second modulation interval to vary the load on the circuit to produce a second ASK signal where switching the circuit from the second arrangement to the first arrangement increases the voltage on the circuit across the load.

In accordance with an embodiment of the present invention a system for wirelessly transmitting power from a power-transmitting device to a power-receiving device includes a power-transmitting device including a transmission circuit, the power-transmitting device being configured to be coupled to a power source. The system further includes a power-receiving device including: a receiving circuit configured to wirelessly receive power from the power-transmitting device; a modulator including an output coupled to a control gate of a switch where the modulator is configured to deliver a control signal to the control gate to alternate the switch between an open state and a closed state to couple and decouple a capacitor to the receiving circuit. The modulator is configured to: operate the switch during modulation intervals to vary a load of the receiving circuit to produce an amplitude shift keying (ASK) signal; and maintain the switch in a default state during operating intervals, the default state comprising one of the open state or the closed state. The system may further include a processor in communication with the modulator and configured to execute an instruction set stored in a non-transitory computer readable medium to instruct the modulator to transpose the default state to the other one of the open state or the closed state while the receiving circuit wirelessly receives power.

BRIEF DESCRIPTION OF THE DRAWINGS

One or more embodiments will now be described, by way of example only, with reference to the annexed figures, wherein:

FIG. 13 depicts a method for modulating a signal;

FIG. 14 depicts a method for modulating a signal;

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

Figure 1:
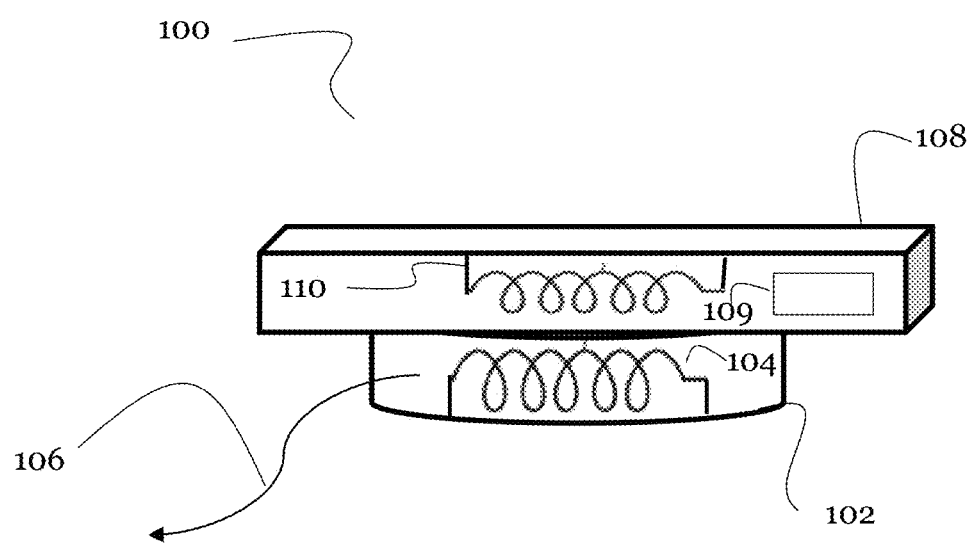
FIG. 1 depicts a system for wirelessly charging a device.

FIG. 1 depicts a system 100 for wirelessly charging a device.

As shown in FIG. 1, the system 100 may comprise a power-transmitting device 102 and a power-receiving device 108. The power-transmitting device 102 may comprise an inductive coil 104. And, the power-receiving device may comprise an inductive coil 110.

The power-transmitting device 102 may be configured to be coupled with a power source by a plug 106. In various embodiments, the plug 106 may be configured to be fitted with a wall socket. The power-transmitting device 102 may comprise a battery in various embodiments that may serve as a power supply for the wireless power transfer from the power-transmitting device 102 to the power-receiving device 108.

The power source may generate an alternating current in the power-transmitting device 102 through the inductive coil 104. This will create an oscillating magnetic field and induce a current in a receiving circuit (described in more detail at least with reference to FIG. 3). The current induced in the power-receiving device 108 by the oscillating magnetic field, in various embodiments, may then be utilized for charging a battery 109 of the power-receiving device 108.

Current received by the power-receiving device 108 may comprise an alternating current. In various embodiments, it may be advantageous to convert alternating current received by the power-receiving device 108 into a direct current. This may be advantageous because many electronic components are compatible with direct current. A voltage regulator may also be utilized to reduce the voltage level of the power supplied to a level compatible with components of the power-receiving device 108.

Figure 2:
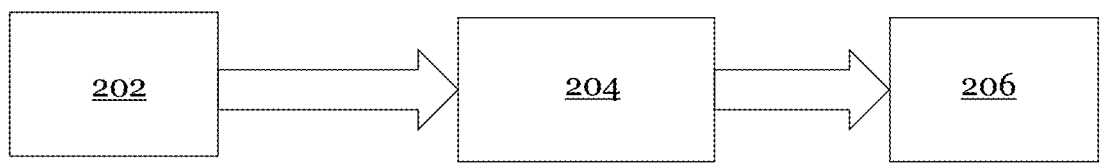
FIG. 2 depicts a block diagram components of a power-receiving device.

FIG. 2 depicts a block diagram components of the power-receiving device 108 in various embodiments. As shown in FIG. 2, current may be induced in a receiving circuit 202. Alternating current may then be directed to a rectifier 204. In various embodiments, the rectifier may comprise a full-bridge rectifier. The rectifier 204 may be coupled with a voltage regulator 206. The voltage regulator 206 may comprise a step down regulator to reduce voltage.

Communication between the power-transmitting device 102 and the power-receiving device 108 may be helpful to establish a coupling and regulate the power transfer. In various embodiments the power-receiving device 108 may communicate to request more or less power from the power-transmitting device 102.

Communication between the power-transmitting device 102 and the power-receiving device 108 may be achieved by Amplitude Shift Keying a signal. The Wireless Power Consortium (WPC) provides the Qi standard for wireless power transfers. And, according to the Qi standard Amplitude Shift Keying may be utilized for communication between the power-transmitting device 102 and the power-receiving device 108.

Amplitude Shift Keying is a form of signal modulation where the variations in the amplitude of a signal are used to transmit data. In various embodiments, the power-receiving device 108 may generate an ASK signal by varying the load of a receiving circuit.

Figure 3:
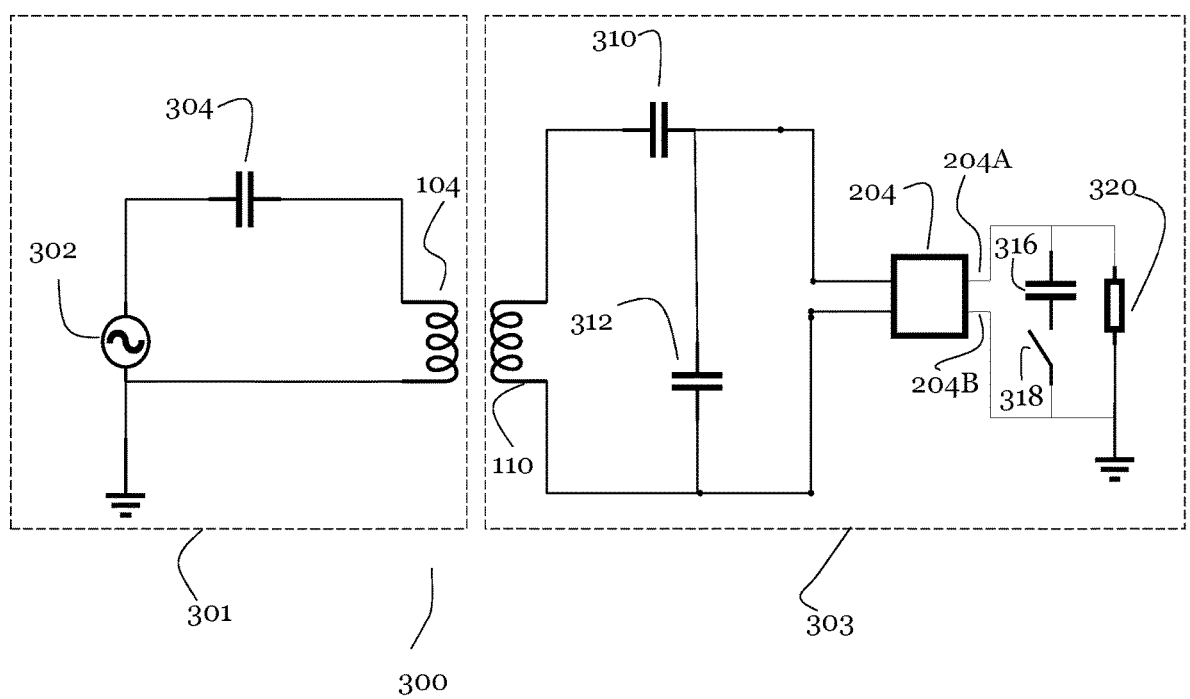
FIG. 3 depicts a system for wirelessly charging a device configured to modulate a load to generate an ASK signal.

FIG. 3 depicts a system 300 for wirelessly charging a device configured to modulate a load to generate an ASK signal.

The system 300 for wirelessly charging a device may comprise a power-transmitting device 102 and a power-receiving device 108. The power-transmitting device 102 may comprise a transmission circuit 301. The transmission circuit 301 may comprise a power source 302. The transmission circuit 301 may further comprise an inductive coil 104 and a capacitor 304.

The system 300 may further comprise a power-receiving device 108. The power-receiving device 108 (not shown in FIG. 3) may comprise a receiving circuit 303. The receiving circuit 303 may comprise an inductive coil 110, a capacitor 310, and a capacitor 312. The circuit receiving 303 may include the capacitor 312 to implement a dual resonance circuit.

In various embodiments, when the power-transmitting device 102 and power-receiving device 108 are arranged so the inductive coil 104 of the transmission circuit 301 and the inductive coil 110 of the receiving circuit 303 are in proximity with each they form an air core transformer. The power source 302 in the transmission circuit 301 may provide an alternating current through the transmission circuit and the inductive coil 110. This may generate an oscillating magnetic field. When the power-receiving device 108 is within a range of the power-transmitting device 102 the oscillating magnetic field generated by the transmission circuit 301 can induce a current in the receiving circuit 303. This allows the receiving circuit 303 to wirelessly receive power from the transmission circuit 301 of the power-transmitting device 102. It should be noted that the ground in the transmission circuit 301 and the ground in the receiving circuit are not a common ground in various embodiments.

In various embodiments, the receiving circuit 303 may also comprise a rectifier 204 to rectify alternating current induced in the receiving circuit 303.

The receiving circuit, 303, may also comprise a modulating capacitor 316. The load of at the output of the receiving circuit 303 may be signified by load 320. However, the load may be varied by coupling and decoupling a modulating capacitor 316 with the receiving circuit 303 by a first switch 318. It may be preferable to utilize a capacitor to vary the load of the receiving circuit 303 rather than a resistor because charge stored in the capacitor may be reintroduced into the receiving circuit rather than wasted. In various embodiments, the first switch 318 may comprise a MOSFET. In various embodiments, the first switch 318 may also comprise any number of the other switches known in the art.

As will be appreciated by one skilled in the art, the first switch 318 may have an open state and a closed state. When the first switch 318 is in the closed state the modulating capacitor 316 may be coupled into the transmission circuit 301. When the first switch 318 is in the open state the modulating capacitor 316 may be decoupled from the transmission circuit 301. In various embodiments, the transmission circuit 301 may also comprise additional modulating capacitors and corresponding switches that can also be coupled into the receiving circuit 303. In various embodiments, additional modulating capacitors and corresponding switches may be parallel to each other when they are coupled into the receiving circuit 303.

The coupling and decoupling of the modulating capacitor 316 into the receiving circuit may alter the system response and the gain of the receiving circuit 303. This will also cause the overall load of the receiving circuit 303 to vary. Thus, by opening and closing the first switch 318, the overall load of the circuit can be changed to produce an ASK modulated signal.

The impact of coupling and decoupling of the modulating capacitor 316 on the system response may vary depending on the switching frequency of the alternating magnetic field. For example, assuming other factors that may vary the system response are held fixed, coupling the modulating capacitor 316 may decrease the gain of the receiving circuit 303 when the frequency is above an inflection point. Decoupling the modulating capacitor 316 may then increase the gain of the receiving circuit 303 when frequency is above the inflection point. When the frequency is below the inflection point, coupling the modulating capacitor 316 may increase the gain of the receiving circuit 303. Decoupling the modulating capacitor 316 may then decrease the gain of the receiving circuit 303 when the frequency is below the inflection point. Other factors that may vary the system response may include alignment and distance of the power-transmitting device 102 and power-receiving device 108, or the load.

By way of further example, if there is an inflection at a frequency of 125 kHz, coupling the modulating capacitor 316 to the receiving circuit 303 may increase the gain of the receiving circuit 303 when the frequency is below 125 kHz and decrease the gain of the receiving circuit 303 when the frequency is greater than 125 kHz. Decoupling the modulating capacitor 316 from the receiving circuit 303 will thus decrease the gain when the frequency is less than 125 kHz and increase the gain when the frequency is above 125 kHz. The frequency of an inflection point may vary among different embodiments.

By coupling and decoupling a modulating capacitor 316 from the receiving circuit 303, the load on the receiving circuit 303 may be varied by alternating the receiving circuit 303 between a first arrangement and a second arrangement. In various embodiments, the receiving circuit 303 may be in the first arrangement when the modulating capacitor 316 is coupled to the receiving circuit 303. And, the receiving circuit 303 may be in the second arrangement when the modulating capacitor 316 is decoupled from the receiving circuit 303.

In various embodiments, the receiving circuit 303 may be in the first arrangement when the modulating capacitor 316 is decoupled to the receiving circuit 303. And, the receiving circuit 303 may be in the second arrangement when the modulating capacitor 316 is coupled from the receiving circuit 303. These arrangements may vary depending on parameters of a power transfer and the switching frequency.

Operation of the first switch 318 may be controlled by a modulator coupled to the first switch 318.

Figure 4:
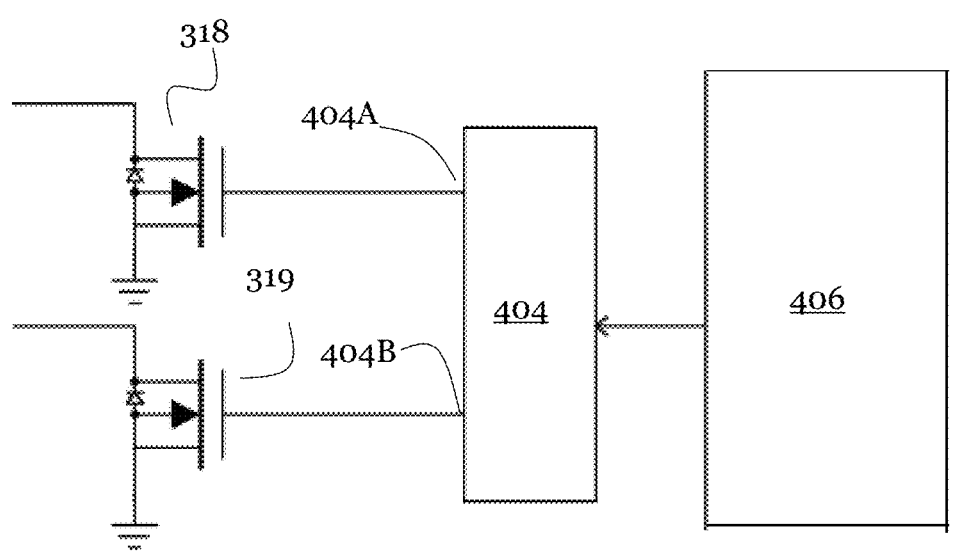
FIG. 4 depicts components for modulation of a signal by a power-receiving device.

FIG. 4 depicts components for modulation of a signal by a power-receiving device.

As shown in FIG. 4, the system 300 may comprise a first switch 318 and a second switch 319. FIG. 4 further depicts a modulator 404, and a processor 406. The components depicted in FIG. 4 that are not depicted in FIG. 3 may be integrated into architecture shown in FIG. 3.

The first switch 318 may comprise a MOSFET and the second switch 319 may comprise a MOSFET. A control gate of the first switch 318 may be coupled with a first output 404A of the modulator 404. A control gate of the second switch 319 may also be coupled with a second output 404B of the modulator 404. And, in various embodiments, the modulator 404 may be in communication with the processor 406.

The modulator 404 may be configured to deliver a control signal to the control gate of the first switch 318 to alternate the first switch 318 between an open state and a closed state. This may couple and decouple the modulating capacitor 316 (as shown in FIG. 3) from the receiving circuit 303.

As mentioned above, the receiving circuit 303 may also comprise additional modulating capacitors that may be coupled and decoupled from the receiving circuit 303 by additional switches. The second switch 319 may comprise a switch to couple and decouple a second modulating capacitor (not shown in FIG. 3) from the receiving circuit 303.

The modulator 404 may be configured to deliver a control signal to the control gate of the second switch 319 to alternate the second switch 319 between an open state and a closed state. This may couple and decouple the second modulating capacitor (not shown in FIG. 3) from the receiving circuit 303.

The first switch 318 and the second switch may be operated in unison in various embodiments. The first switch 318 and the second switch 319 may both be open or both be closed at the same times. In various embodiments, one signal from the output may operate both the first switch 318 and the second switch 319.

Additional modulating capacitors may be coupled and decoupled from the receiving circuit 303 by additional switches. In various embodiments operation of the additional switches may also be controlled by the modulator 404.

Varying the load of the receiving circuit 303 will impact the voltage of the receiving circuit 303 across the load. The power-transmitting device 102 may sense these variations and demodulate the signal.

Figure 5:
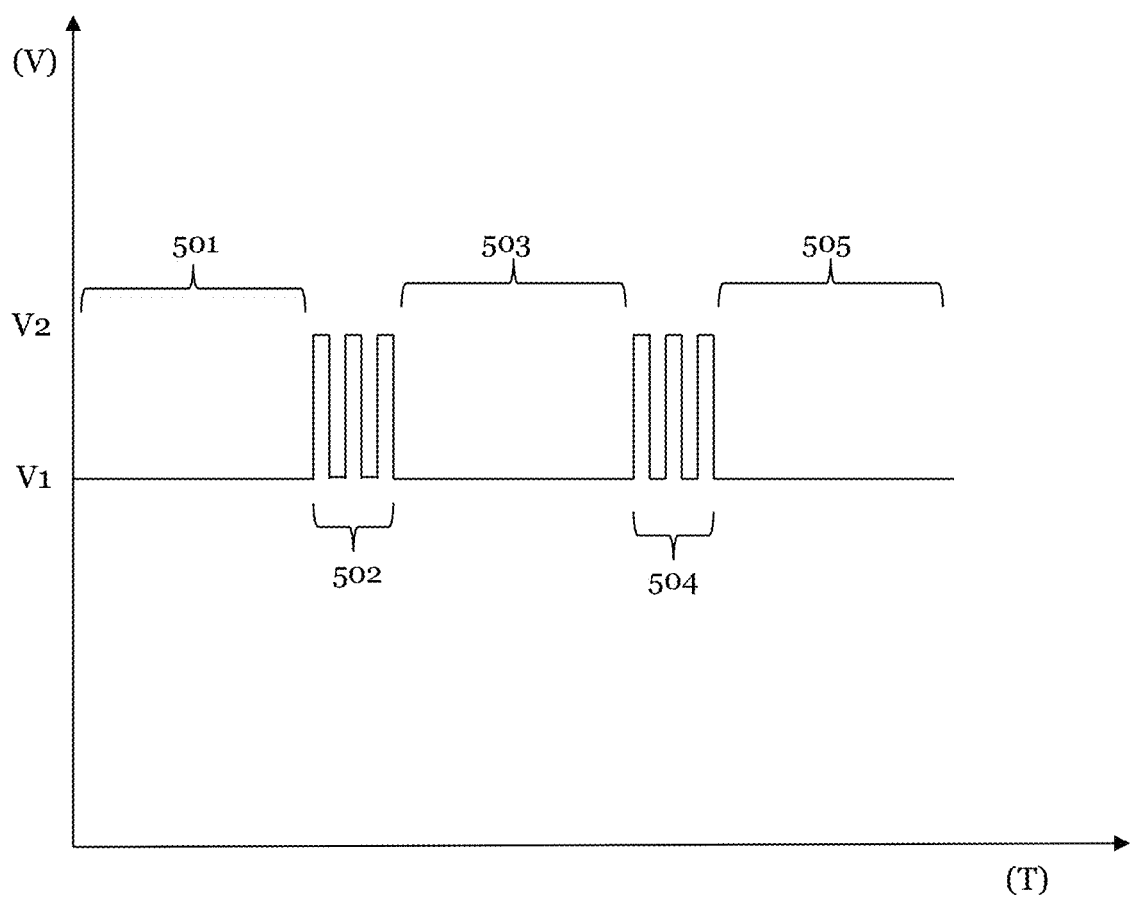
FIG. 5 depicts a waveform showing the voltage across the load of the receiving circuit during modulation time periods.

FIG. 5 depicts a waveform showing the voltage across the load of the receiving circuit during modulation time periods.

FIG. 5 shows a waveform of the voltage across a load of the receiving circuit 303 while the modulating capacitor 316 is being coupled and decoupled from the receiving circuit 303. In various embodiments, the voltage across the load may comprise the voltage between a first node 204A and a second node 204B, as shown in FIG. 3. Returning to FIG. 5, during a first operating interval 501, the voltage across the load may be at, or substantially at, a level V1 while the power-transmitting device 102 is transmitting power to the power-receiving device 108. During a first modulation interval 502 the modulator 404 may operate the first switch 318, and any additional switches, to couple and decouple the modulating capacitor 316, and any additional capacitors, from the receiving circuit 303 to vary the voltage across the load. In various embodiments, this may increase and decrease the voltage across the load between V1 and V2. As shown in FIG. 5, V2 is higher than V1.

During a second operating interval 503, the receiving circuit 303 may continue to receive power from the power-transmitting device 102 and the voltage of the receiving circuit 303 may remain at V1. Modulation may be performed again during a second modulation interval 504. And, the process may be repeated for as long as desired.

Modulation may also be achieved by reducing the voltage across the load rather than increasing the voltage across the load.

Figure 6:
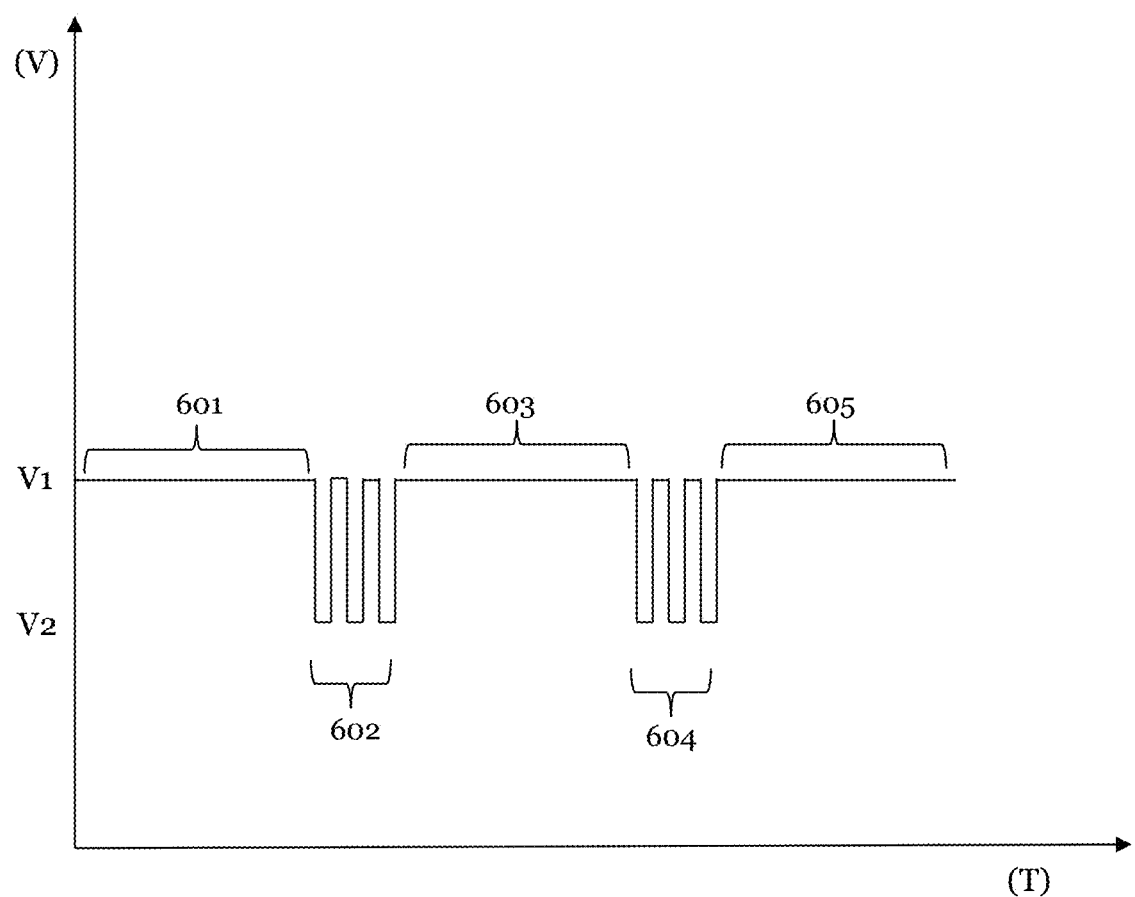
FIG. 6 depicts a waveform showing the voltage across the load of the receiving circuit during modulation time periods.

FIG. 6 depicts a waveform showing the voltage across the load of the receiving circuit during modulation time periods.

FIG. 6 shows a waveform of the voltage across a load of the receiving circuit 303 while the modulating capacitor 316 is being coupled and decoupled from the receiving circuit 303. During a first operating interval 601, the voltage across the load may be at, or substantially at, a level V1 while the power-transmitting device 102 is transmitting power to the power-receiving device 108. Much like the waveform depicted in FIG. 5, during a first modulation interval 602, the modulator 404 may operate the first switch 318, and any additional switches, to couple and decouple the modulating capacitor 316, and any additional capacitors, from the receiving circuit 303 to vary the voltage across the load. In various embodiments, this may increase and decrease the voltage across the load between V1 and V2. As shown in FIG. 6, however, the V2 may be lower than V1.

Again, like the waveform depicted in FIG. 5, during a second operating interval 603, the receiving circuit 303 may continue to receive power from the power-transmitting device 102 and the voltage of the receiving circuit 303 may remain at V1. Modulation may be performed again during a second modulation interval 604. And, the process may be repeated for as long as required.

In various embodiments, the receiving circuit will continue to receive power during modulation intervals. In various embodiments, the voltage level during operating intervals may fluctuate. Indeed, communication between the power-receiving device 108 and the power-transmitting device 102 by the modulation may prompt the power-transmitting device 102 to decrease or increase the level of the power transmission and thereby increase or decrease the voltage level during operation periods. In various embodiments, modulation intervals may occur at preset times. In various embodiments, modulation intervals may occur as needed. It should also be appreciated that the arrangement required to increase the voltage across the load of the receiving circuit 303 may vary depending on the switching frequency as explained above.

In various embodiments, the modulator 404 may be configured to operate the modulating capacitor 316, and additional switches if present, to vary a load of the receiving circuit according to a differential bi-phase encoding scheme for an ASK signal.

Figure 7A:
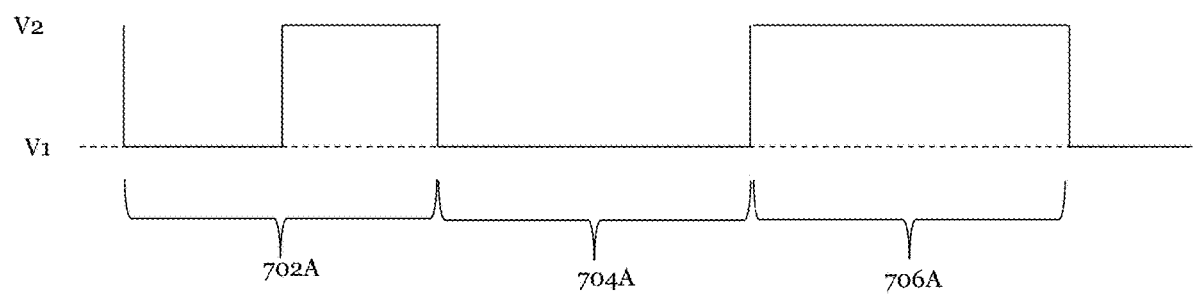
FIG. 7a depicts a modulated signal according to a differential bi-phase encoding scheme.

FIG. 7a depicts a modulated signal according to a differential bi-phase encoding scheme.

For a differential bi-phase encoding scheme, a time period may correspond to a bit of data. FIG. 7A depicts a first time period 702A, a second time period 704A, and a third time period 706A. The number of transitions from one voltage level to another (in an ASK signal) will determine the bit value of the time period. For example, a "1" may be represented by a time period with a transition from one voltage level during the time period. And, "0" may be represented by a time period without a transition during the time period. In such a scheme, the first time period 702A may correspond to a "1", the second time period 704A may correspond to a "0," and the third time period 706A may also correspond to a "0". As will be appreciated, the bit values attached to the signals may also be reversed so that time periods with transitions correspond to a "0" and time periods without transitions may correspond to a "1". In various embodiments, the time periods may correspond to clock periods. Transitions between voltage levels may be caused by the coupling or decoupling of the modulating capacitor 316, and any additional modulating capacitors, if present. As depicted in FIG. 7A, V2 is greater than V1. Increasing the voltage may be caused by coupling the modulating capacitor 316, and any additional modulating capacitors, or decoupling the modulating capacitor 316, and any additional modulating capacitors, depending on the switching frequency.

Figure 7B:
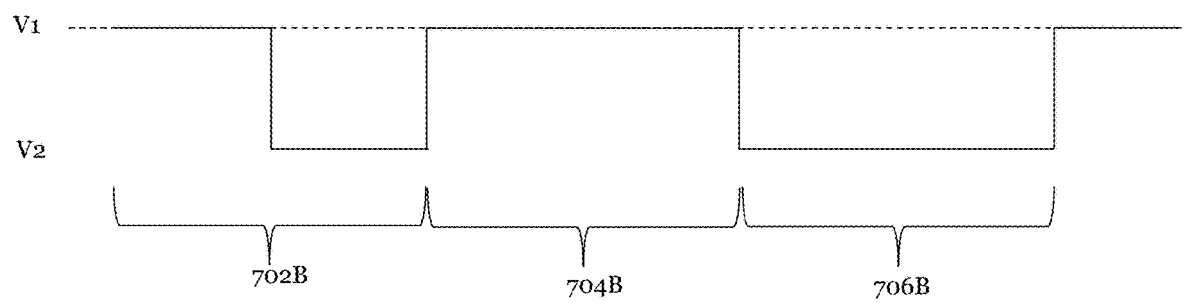
FIG. 7B depicts a modulated signal according to a differential bi-phase encoding scheme.

FIG. 7B depicts a modulated signal according to a differential bi-phase encoding scheme.

Like FIG. 7A, FIG. 7B depicts a first time period 702B, a second time period 704B, and a third time period 706B. The number of transitions from one voltage level to another (in an ASK signal) may again determine the bit value of the time period as described with reference to FIG. 7A. However, in FIG. 7B, V2 is lower than V1. Despite this, the waveform in FIG. 7B may communicate the same bit sequence as FIG. 7A because the corresponding time periods have the same number of transitions. Decreasing the voltage from V1 to V2 may be caused by coupling the modulating capacitor 316, and any additional modulating capacitors, or decoupling the modulating capacitor 316, and any additional modulating capacitors, depending on the switching frequency.

In various embodiments, a default state of the first switch 318, and any additional switches like the second switch 319, may be determined for a power transfer between a power-transmitting device 102 and power-receiving device 108. This may occur after a coupling between the power-transmitting device 102 and a power-receiving device 108, but before power is transmitted to a battery of the power-receiving device 108. Transmissions between the power-transmitting device 102 and the power-receiving device 108 may be utilized to establish an initial power level for transmission and a default state for the first switch 318, and any additional switches like the second switch 319. In various embodiments, it may be preferable to open the first switch 318, and any additional switches like the second switches 319, to prevent loss of energy stored in the modulating capacitor 318. The default state of the switch may be open or it may be closed. The first switch 318, and any additional switches like second switch 319, may be in the default state during operating intervals and alternated between the default state and the opposite state during modulation intervals to vary the load of the receiving circuit.

For example, if the first switch 318, and any additional switches like second switch 319, are open in the default state, the modulating capacitor 316, and any additional modulating capacitors, are decoupled from the receiving circuit 303 in the default state. The modulator may be configured to maintain the default state and keep the modulating capacitor 316, and any additional modulating capacitor, decoupled during operating intervals so the load will not vary significantly. During modulation intervals, the modulator may be configured to operate the switch to alternate the switch between the open state (the default state in this example) and the closed state to vary the load and modulate the signal.

When the first switch 318, and any additional switches like the second switch 319, are closed in the default state, the modulating capacitor 316 and any additional modulating capacitors are coupled with the receiving circuit 303 during operating intervals.

The default state of the first switch 318, and any additional switches like second switch 319, may determine whether the modulation shifts the voltage in a positive direction (like depicted FIG. 5 and FIG. 7A) or a negative direction (like depicted in FIGS. 6 and 7b) to encode information. For example, for a given a frequency where coupling the modulating capacitor 316 and any additional modulation capacitors increases the voltage across the load of the receiving circuit 303, a default open setting for the first switch, and any additional switches, allows modulation to increase the voltage above the voltage seen during operational intervals like depicted in FIGS. 5 and 7A. For this example, a default closed setting for the first switch 318, and any additional switches like second switch 319, allows modulation to lower the voltage below the voltage seen during operating intervals FIGS. 6 and 7B.

For a given a frequency where coupling the modulating capacitor 316 and any additional modulation capacitors decreases the voltage across the load of the receiving circuit 303, an open default state allows modulation by lowering the voltage below the voltage seen during operating period like in FIGS. 6 and 7B. For this example, a default closed setting for the first switch 318, and any additional switches like second switch 319, allows modulation to increase the voltage over the voltage seen during operational intervals like depicted in FIGS. 5 and 7A.

As can be appreciated, different devices may prefer different voltage levels for a power transfer. For example, a power-receiving device 108 comprising a larger battery, like a tablet, may prefer a higher voltage. A power-receiving device 108 with a smaller battery, like a smart watch may prefer a lower voltage.

In various embodiments the increased or decreased voltage across the load of the receiving circuit 303 may lead to undesirable results if the voltage becomes too high or too low. Referring back to FIG. 5, if the voltage at V2 becomes too high it may damage components of the power-receiving device 108. This may also lead the power-receiving device 108 to communicate with the power-transmitting device 102 to decrease the level of the voltage during operation, which may slow down the transfer of power from the power-transmitting device 102 to power-receiving device 108. In various embodiments this may increase the time needed to charge a battery.

Figure 8:
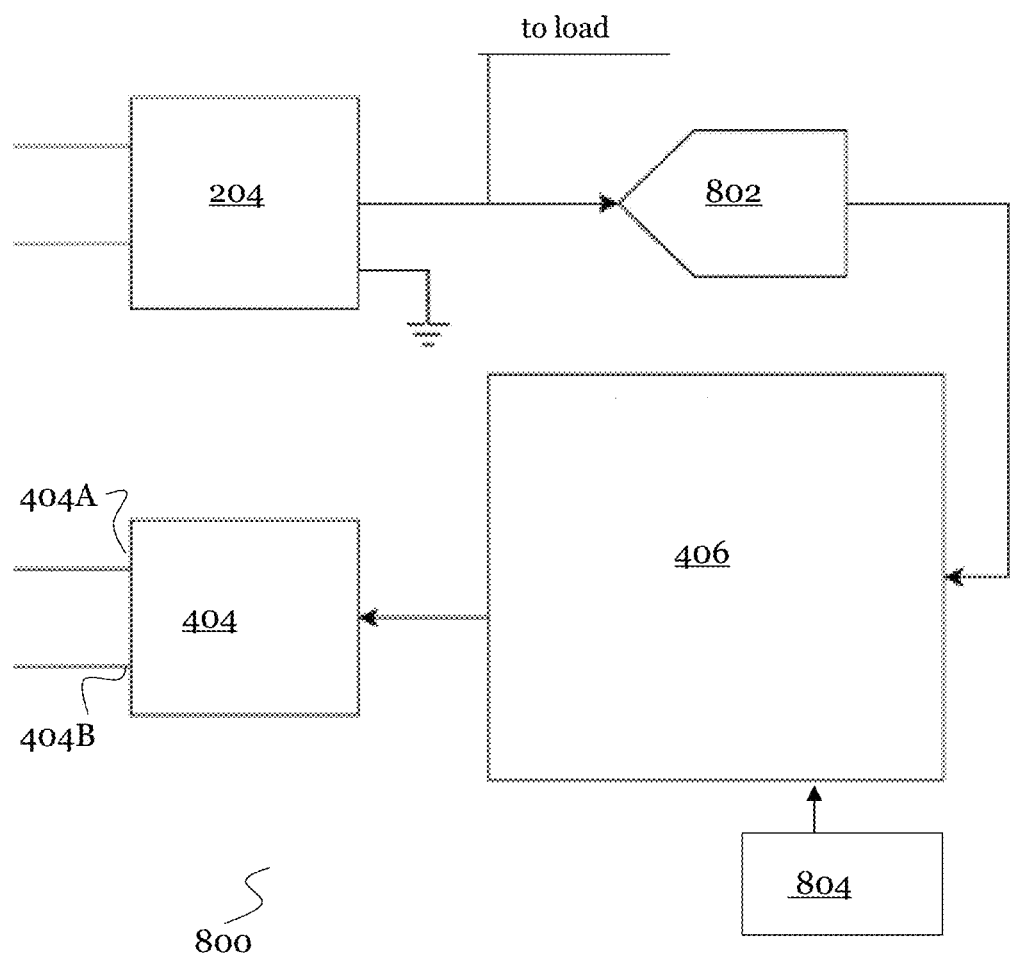
FIG. 8 depicts a block diagram of a system to avoid undesirably high and low voltages on the receiving circuit.

Referring now to FIG. 6, the voltage at V2 may become lower than desirable. This may be undesirable because a low voltage may trigger an Under Voltage Lockout (UVLO) and cause the power-receiving device 108 to be reset FIG. 8 depicts a block diagram of a system 800 to avoid undesirably high and low voltages on the receiving circuit.

The system 800 may incorporate the rectifier 204, processor 406, and modulator 404. The modulator may deliver a control signal to the first switch 318, the second switch 319, and any additional switches to vary the load of the receiving circuit 303 to modulate a signal. The modulator may maintain the first switch 318, the second switch 319, and any additional switches in the default state, whether that may be open or closed, during operational intervals when modulation is not occurring The processor 406 may be in communication with the modulator 404 and may execute an instruction set stored in a non-transitory computer readable medium 804 to instruct the modulator 404 to transpose the default state to the opposite state. This may occur while the receiving circuit 303 is receiving power without interrupting a power transfer between a power-transmitting device 102 and a power-receiving device 108 For example, if the default state is open, transposing the default state to the opposite state causes the default state to assume the closed state. As a result, this will cause the polarity of the voltage shifts occurring during modulation to be reversed from positive (like depicted in FIGS. 5 and 7A) to negative (like depicted in FIGS. 6 and 7B) or from negative to positive depending on the frequency of the circuit. If the default state is closed, transposing the default state to the opposite state causes the default state to assume the open state. This is advantageous because the default setting can be switched if modulation pushes the voltage across the load of the receiving circuit 303 too high or too low. And, this can be accomplished during an ongoing power transfer.

In various embodiments, the system may also comprise an analog to digital converter 802. The analog to digital converter 802 may convert the voltage level across the load of the receiving circuit into a digital signal. The processor 406 may receive the digital signal. The processor may be triggered to instruct the modulator to transpose the default state when the voltage level at the load exceeds a threshold level, or falls below a threshold level. The components depicted in FIG. 8 may be integrated into the architecture shown in FIG. 3 and FIG. 4.

Figure 9:
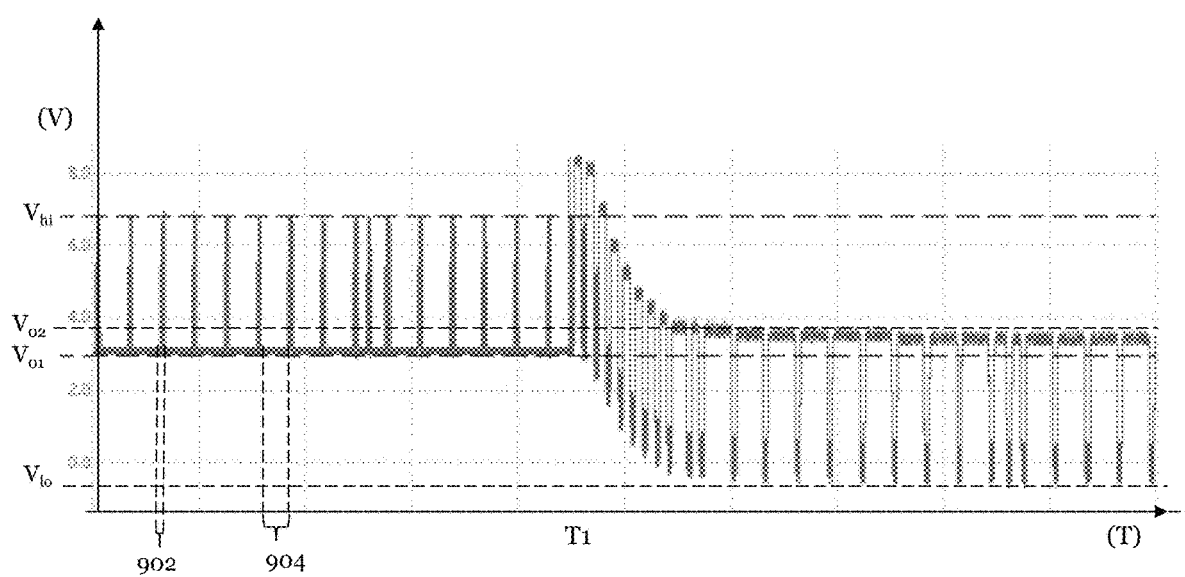
FIG. 9 shows a waveform before and after the default state of one or more switches is transposed.

FIG. 9 shows a waveform before and after the default state of one or more switches of a receiving circuit is transposed.

The waveform in FIG. 9 depicts the magnitude of the variation in the voltage across the load of circuit 303 while a power-transmitting device 102 is coupled to power-receiving device 108 to transmit power. FIG. 9 depicts a plurality of modulation intervals like 902 and plurality of operating intervals like 904. Before time T1, the voltage across the load of the receiving circuit 303 is varied between $V_{o1}$ and $V_{hi}$ to modulate the signal. Before time T1, the voltage remains at or near $V_{o1}$ during operating intervals. At time T1, the default state of the first switch 318, and any additional switches like second switch 319, is transposed to the opposite state. For example, if the default state before T1 is open, the default state after T1 is closed. If the default state before T1 is closed, the default state after T1 is open. As depicted in FIG. 9, after the default is transposed the voltage will vary between $V_{o2}$ and $V_{lo}$ during modulation intervals and remain near $V_{o2}$ during operating intervals. Transposing the default allows the system 300 to reverse the polarity of the modulation from increases in voltage (before T1) to decreases in voltage (after T1). Undesirably high voltages across the load of the circuit 303 may, thus, be avoided and the voltage level during the operating intervals may be maintained, or even increased. And, in various embodiment transposition of the default stat can occur without interrupting an ongoing power transfer from the power-transmitting device 102 to the power-receiving device 108.

After the default state is transposed at T1, voltage across the load of the receiving circuit 303 during operating intervals may temporarily increase in some cases. This can be due to the transposition of the circuit 303 from the low gain default state to the high gain default state. However, the power-transmitting device 102 may receive the modulated signal and adjust the oscillating magnetic field according to the modulated signal to so the voltage level is reduced until it reaches $V_{o2}$.

Figure 10:
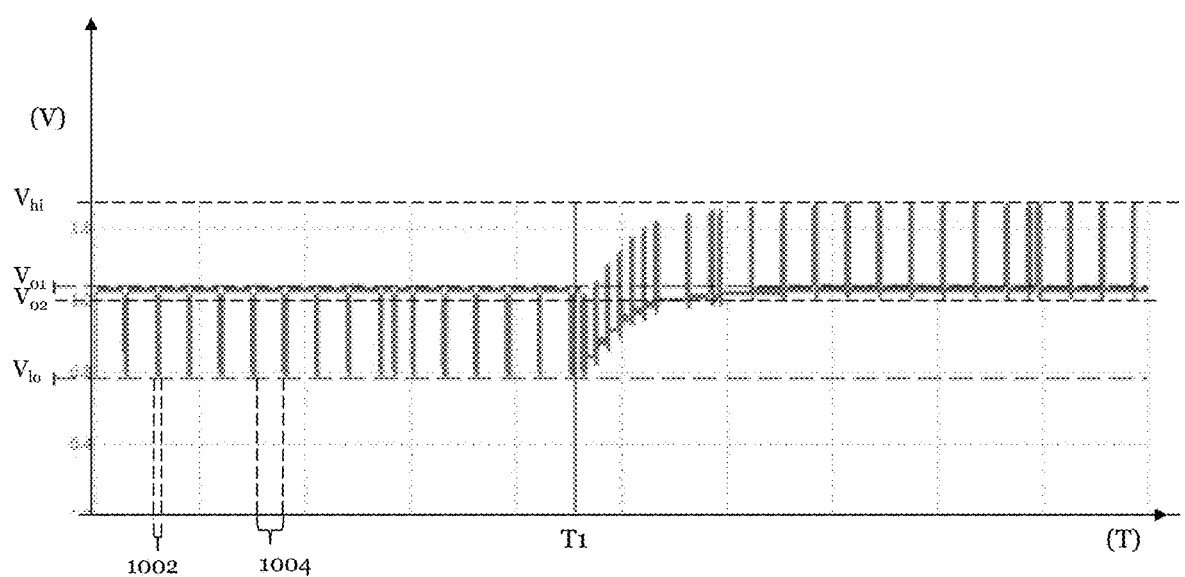
FIG. 10 shows a waveform before and after the default state of one or more switches is transposed.
Figure 11:
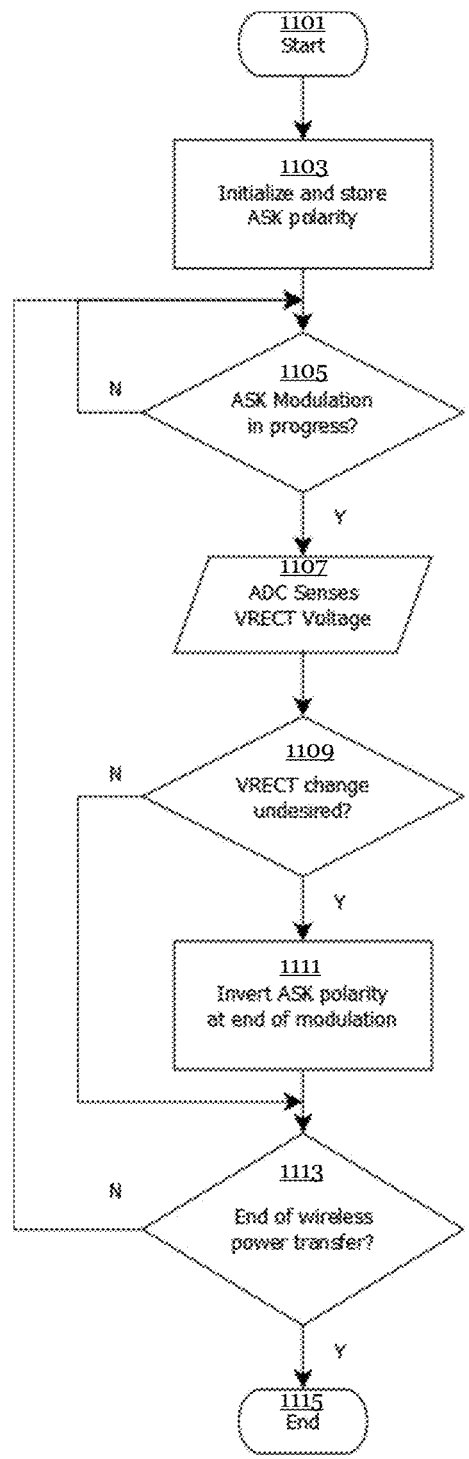
FIG. 11 is a flow chart representing a method to avoid undesirably high or low voltages during a wireless transmission.

FIG. 10 shows a waveform before and after the default state of one or more switches of a receiving circuit is transposed.

Like FIG. 9, the waveform in FIG. 10 depicts the magnitude of the variation in the voltage across the load of circuit 303 while a power-transmitting device 102 is coupled to power-receiving device 108 to transmit power. FIG. 10 depicts a plurality of modulation intervals like 1002 and plurality of operating intervals like 1004. Before time T1, the voltage across the load of the receiving circuit 303 is varied between $V_{o1}$ and $V_{lo}$ to modulate the signal. Before time T1, the voltage remains near $V_{o1}$ during operating intervals. At time T1, the default state of the first switch 318 and any additional switches like second switch 319 is transposed to the opposite state. For example, if the default state before T1 is open, the default state after T1 is closed. If the default state before T1 is closed, the default state after T1 is open. As depicted in FIG. 10, after the default is transposed the voltage will vary between $V_{o2}$ and $V_{hi}$ during modulation intervals and remain at or near $V_{o2}$ during operating intervals. Transposing the default state allows the system 300 to reverse the polarity of the modulation from decreases in voltage (before T1) to increases in voltage (after T1). Undesirably low voltages across the load of the circuit 303 may, thus, be avoided and the voltage level during the operating intervals may be maintained, or potentially decreased, if desirable. And, in various embodiment transposition of the default stat can occur without interrupting an ongoing power transfer from the power-transmitting device 102 to the power-receiving device 108.

After the default state is transposed at T1, there may be a transition period when the power-transmitting device 102 may receive the modulated signal and adjusts the oscillating magnetic field according to the modulated signal to so the voltage level during operating intervals is increased until it reaches $V_{o2}$.

FIG. 1i is a flow chart representing a method to avoid undesirably high or low voltages during a wireless transmission.

At a step 1101, the method starts. At a step 1103, the wireless power transfer may be initialized between a power-transmitting device and a power-receiving device, and the ASK polarity for modulation, positive (like depicted in FIGS. 5 and 7a) or negative (like depicted in FIG. 6 or 7B) is stored. At a step 1105 it is checked whether ASK modulation is in progress. At a step 1110, an ADC senses the voltage after rectification. At step 1109, it may be determined whether the voltage after rectification is undesired (too high or too low). At a step 1111 the ASK polarity may be inverted at the end of an ongoing modulation interval. At a step 1113, the method may comprise checking to see if the wireless power transfer is complete.

Figure 12:
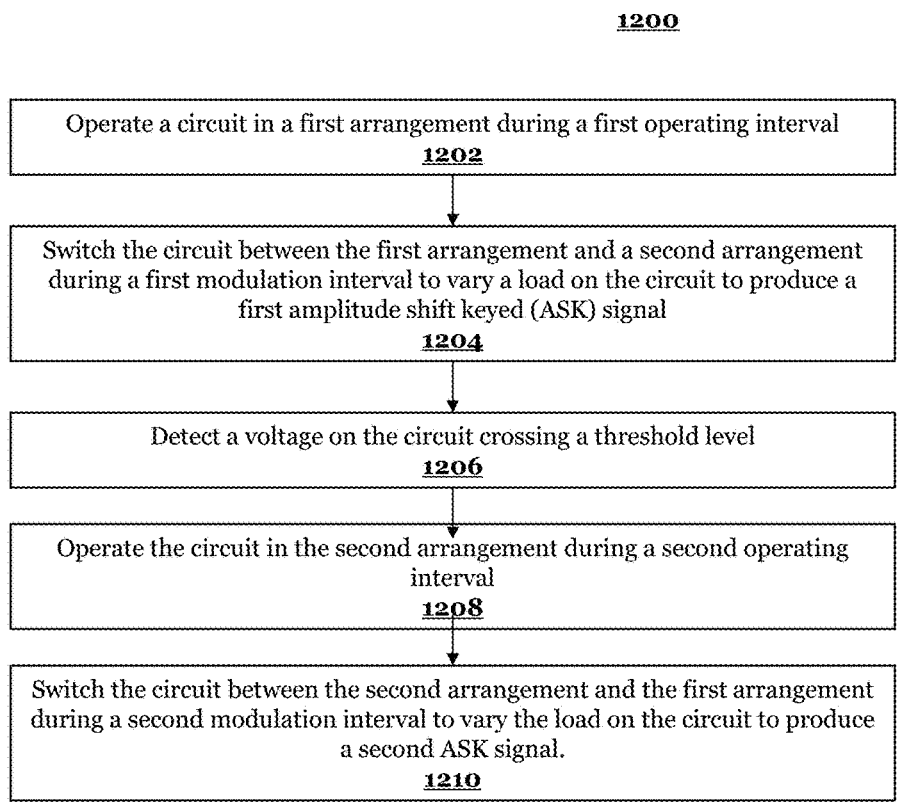
FIG. 12 depicts a method or modulating a signal.

FIG. 12 depicts a method 1200 for modulating a signal.

The method 1200 may comprise at a step 1202 operating a circuit in a first arrangement during a first operating interval; at a step 1204 switching the circuit between the first arrangement and a second arrangement during a first modulation interval to vary a load on the circuit to produce a first amplitude shift keying (ASK) signal; at a step 1206 detecting a voltage on the circuit crossing a threshold level; at a step 1208 operating the circuit in the second arrangement during a second operating interval; and at a step 1210 switching the circuit between the second arrangement and the first arrangement during a second modulation interval to vary the load on the circuit to produce a second ASK signal.

The method 1200 may further comprise, wherein the first ASK signal and the second ASK signal are modulated according to a differential bi-phase encoding scheme.

The method 1200 may further comprise, establishing a wireless coupling between a power transmitter and a power receiver to transfer power to charge a battery of the power receiver wherein the power receiver comprises the circuit.

The method 1200 may further comprise, maintaining the wireless coupling during the first operating interval, the first modulation interval, the second operating interval, and the second modulation interval.

The method 1200 may further comprise: receiving the first ASK signal and the second ASK signal by the power transmitter; and adjusting a power level of power transferred from the power transmitter to the power receiver based on the first ASK signal, the second ASK signal or both.

The method 1200 may further comprise, wherein the circuit is switched from the first arrangement to the second arrangement by coupling one or more capacitors to the circuit.

The method 1200 may further comprise, wherein the circuit is switched from the second arrangement to the first arrangement by decoupling one or more capacitors from the circuit.

The method 1200 may further comprise, wherein the circuit is switched from the first arrangement to the second arrangement by decoupling one or more capacitors from the circuit.

The method 1200 may further comprise, wherein the circuit is switched from the second arrangement to the first arrangement by coupling one or more capacitors from the circuit.

FIG. 13 depicts a method 1300 for modulating a signal.

The method 1300 may comprise: at a step 1302 operating a circuit in a first arrangement during a first operating interval; at a step 1304 switching the circuit between the first arrangement and a second arrangement during a first modulation interval to vary a load on the circuit to produce a first amplitude shift keying (ASK) signal wherein switching the circuit from the first arrangement to the second arrangement increases the voltage on the circuit across the load; at a step 1306 detecting a voltage on the circuit exceeding a threshold level; at a step 1308 operating the circuit in the second arrangement during a second operating interval; and at a step 1310 switching the circuit between the second arrangement and the first arrangement during a second modulation interval to vary the load on the circuit to produce a second ASK signal wherein switching the circuit from the second arrangement to the first arrangement decreases the voltage on the circuit across the load.

The method 1300 may further comprise, wherein the first ASK signal and the second ASK signal are modulated according to a differential bi-phase encoding scheme.

The method 1300 may further comprise: establishing a wireless coupling between a power transmitter and a power receiver to transfer power to charge a battery wherein the power receiver comprises the circuit; and maintaining the wireless coupling during the first operating interval, the first modulation interval, the second operating interval, and the second modulation interval.

The method 1300 may further comprise, wherein the circuit is switched from the first arrangement to the second arrangement by coupling one or more capacitors to the circuit.

The method 1300 may further comprise, wherein the circuit is switched from the second arrangement to the first arrangement by decoupling one or more capacitors from the circuit.

The method 1300 may further comprise, wherein the circuit is switched from the first arrangement to the second arrangement by decoupling one or more capacitors from the circuit.

The method 1300 may further comprise, wherein the circuit is switched from the second arrangement to the first arrangement by coupling one or more capacitors from the circuit.

FIG. 14 depicts a method 1400 for modulating a signal.

The method 1400 may comprise: at a step 1402 operating a circuit in a first arrangement during a first operating interval; at a step 1404 switching the circuit between the first arrangement and a second arrangement during a first modulation interval to vary a load on the circuit to produce a first amplitude shift keying (ASK) signal wherein switching the circuit from the first arrangement to the second arrangement decreases the voltage on the circuit across the load; at a step 1406 detecting a voltage on the circuit falling below a threshold level; at a step 1408 operating the circuit in the second arrangement during a second operating interval; and at a step 1410 switching the circuit between the second arrangement and the first arrangement during a second modulation interval to vary the load on the circuit to produce a second ASK signal wherein switching the circuit from the second arrangement to the first arrangement increases the voltage on the circuit across the load.

The method 1400 may further comprise, wherein the first ASK signal and the second ASK signal are modulated according to a differential bi-phase encoding scheme.

The method 1400 may further comprise: establishing a wireless coupling between a power transmitter and a power receiver to transfer power to charge a battery wherein the power receiver comprises the circuit; and maintaining the wireless coupling during the first operating interval, the first modulation interval, the second operating interval, and the second modulation interval.

The method 1400 may further comprise, wherein the circuit is switched from the first arrangement to the second arrangement by coupling one or more capacitors to the circuit.

The method 1400 may further comprise, wherein the circuit is switched from the second arrangement to the first arrangement by decoupling one or more capacitors from the circuit.

The method 1400 may further comprise, wherein the circuit is switched from the first arrangement to the second arrangement by decoupling one or more capacitors from the circuit.

The method 1400 may further comprise, wherein the circuit is switched from the second arrangement to the first arrangement by coupling one or more capacitors from the circuit.

Example 1. A method for modulating a signal including: operating a circuit in a first arrangement during a first operating interval; switching the circuit between the first arrangement and a second arrangement during a first modulation interval to vary a load on the circuit to produce a first amplitude shift keying (ASK) signal; detecting a voltage on the circuit crossing a threshold level; operating the circuit in the second arrangement during a second operating interval; and switching the circuit between the second arrangement and the first arrangement during a second modulation interval to vary the load on the circuit to produce a second ASK signal.

Example 2. The method of Example 1 where the first ASK signal and the second ASK signal are modulated according to a differential bi-phase encoding scheme.

Example 3. The method Example 1 or 2, further including: establishing a wireless coupling between a power transmitter and a power receiver to transfer power to charge a battery of the power receiver where the power receiver includes the circuit; maintaining the wireless coupling during the first operating interval, the first modulation interval, the second operating interval, and the second modulation interval; receiving the first ASK signal and the second ASK signal by the power transmitter; and adjusting a power level of power transferred from the power transmitter to the power receiver based on the first ASK signal, the second ASK signal or both.

Example 4. The method of Examples 1-3, where the circuit is switched from the first arrangement to the second arrangement by coupling one or more capacitors to the circuit.

Example 5. The method of Examples 1-4, where the circuit is switched from the second arrangement to the first arrangement by decoupling one or more capacitors from the circuit.

Example 6. The method of Examples 1-5, where the circuit is switched from the first arrangement to the second arrangement by decoupling one or more capacitors from the circuit.

Example 7. The method of Examples 1-6, where the circuit is switched from the second arrangement to the first arrangement by coupling one or more capacitors from the circuit.

Example 8. A method for modulating a signal including: operating a circuit in a first arrangement during a first operating interval; switching the circuit between the first arrangement and a second arrangement during a first modulation interval to vary a load on the circuit to produce a first amplitude shift keying (ASK) signal where switching the circuit from the first arrangement to the second arrangement increases a voltage on the circuit across the load; detecting a voltage on the circuit exceeding a threshold level; operating the circuit in the second arrangement during a second operating interval; and switching the circuit between the second arrangement and the first arrangement during a second modulation interval to vary the load on the circuit to produce a second ASK signal where switching the circuit from the second arrangement to the first arrangement decreases the voltage on the circuit across the load.

Example 9. The method of Example 8, further including: establishing a wireless coupling between a power transmitter and a power receiver to transfer power to charge a battery where the power receiver includes the circuit; maintaining the wireless coupling during the first operating interval, the first modulation interval, the second operating interval, and the second modulation interval; and where the first ASK signal and the second ASK signal are modulated according to a differential bi-phase encoding scheme.

Example 10. The method of Examples 8 or 9, where the circuit is switched from the first arrangement to the second arrangement by coupling one or more capacitors to the circuit.

Example 11. The method of Examples 8-10, where the circuit is switched from the second arrangement to the first arrangement by decoupling one or more capacitors from the circuit.

Example 12. The method of Examples 8-11, where the circuit is switched from the first arrangement to the second arrangement by decoupling one or more capacitors from the circuit.

Example 13. The method of Examples 8-12, where the circuit is switched from the second arrangement to the first arrangement by coupling one or more capacitors from the circuit.

Example 14. A method for modulating a signal including: operating a circuit in a first arrangement during a first operating interval; switching the circuit between the first arrangement and a second arrangement during a first modulation interval to vary a load on the circuit to produce a first amplitude shift keying (ASK) signal where switching the circuit from the first arrangement to the second arrangement decreases a voltage on the circuit across the load; detecting a voltage on the circuit falling below a threshold level; operating the circuit in the second arrangement during a second operating interval; and switching the circuit between the second arrangement and the first arrangement during a second modulation interval to vary the load on the circuit to produce a second ASK signal where switching the circuit from the second arrangement to the first arrangement increases the voltage on the circuit across the load.

Example 15. The method of Example 14, further including: establishing a wireless coupling between a power transmitter and a power receiver to transfer power to charge a battery wherein the power receiver includes the circuit; maintaining the wireless coupling during the first operating interval, the first modulation interval, the second operating interval, and the second modulation interval; and where the first ASK signal and the second ASK signal are modulated according to a differential bi-phase encoding scheme.

Example 16. The method of Examples 14 or 15, where the circuit is switched from the first arrangement to the second arrangement by coupling one or more capacitors to the circuit.

Example 17. The method of Examples 14-16, where wherein the circuit is switched from the second arrangement to the first arrangement by decoupling one or more capacitors from the circuit.

Example 18. The method of Examples 14-17 where the circuit is switched from the first arrangement to the second arrangement by decoupling one or more capacitors from the circuit.

Example 19. The method of Examples 14-17 where the circuit is switched from the second arrangement to the first arrangement by coupling one or more capacitors from the circuit.

Example 20. A system for wirelessly transmitting power from a power-transmitting device to a power-receiving device including: a power-transmitting device including a transmission circuit, the power-transmitting device being configured to be coupled to a power source; and a power-receiving device including: a receiving circuit configured to wirelessly receive power from the power-transmitting device; a modulator including an output coupled to a control gate of a switch wherein the modulator is configured to deliver a control signal to the control gate to alternate the switch between an open state and a closed state to couple and decouple a capacitor to the receiving circuit; where the modulator is configured to: operate the switch during modulation intervals to vary a load of the receiving circuit to produce an amplitude shift keying (ASK) signal; and maintain the switch in a default state during operating intervals, the default state including one of the open state or the closed state; and a processor in communication with the modulator and configured to execute an instruction set stored in a non-transitory computer readable medium to instruct the modulator to transpose the default state to the other one of the open state or the closed state while the receiving circuit wirelessly receives power.

Example 21. The system of Example 20, where the ASK signal is modulated according to a differential bi-phase encoding scheme.

Example 22. The system of Example 20 or 21, where the transmission circuit includes a first inductive coil configured to generate an oscillating magnetic field to induce a current in the receiving circuit.

Example 23. The system of Example 20-23, where the power-transmitting device is configured to receive the ASK signal and adjust the oscillating magnetic field according to the ASK signal.

Example 24. The system of Example 20-24, where the power-receiving device further includes an analog to digital converter configured to convert a voltage level across the load of the receiving circuit into a digital signal wherein the processor is configured to receive the digital signal and the processor is triggered to instruct the modulator to transpose the default state when the voltage level at the load exceeds a threshold level.

The references used herein are provided merely for convenience and hence do not define the extent of protection or the scope of the embodiments.

References to illustrative embodiments in this description are not intended to be construed in a limiting sense. Various modifications and combinations of the illustrative embodiments, as well as other embodiments will be apparent to persons skilled in the art upon reference to the description. It is therefore intended that the appended claims encompass any such modifications or embodiments.

What is claimed is:

1. A method for modulating a signal comprising:
operating, in a first time period, a power receiver circuit in a first arrangement during a first operating interval of the first time period, wherein the first time period comprises the first operating interval and a first modulation interval;
switching, in the first time period, the power receiver circuit between the first arrangement and a second arrangement during the first modulation interval of the first time period to vary a load on the power receiver circuit to produce a first amplitude shift keying (ASK) signal, wherein the first ASK signal is configured to carry a first digital value for reception by a power transmitter circuit;
detecting a voltage on the power receiver circuit crossing a threshold level;
operating, in a second time period, the power receiver circuit in the second arrangement during a second operating interval of the second time period, wherein the second time period comprises the second operating interval and a second modulation interval; and
switching, in the second time period, the power receiver circuit between the second arrangement and the first arrangement during the second modulation interval of the second time period to vary the load on the power receiver circuit to produce a second ASK signal, wherein the second ASK signal is configured to carry a second digital value for reception by the power transmitter circuit, wherein the first time period and the second time period are two adjacent time periods in a plurality of continuous time periods, wherein data transmission between the power receiver circuit and the power transmitter circuit occurs during each of the plurality of continuous time periods.

2. The method of claim 1, wherein the first ASK signal and the second ASK signal are modulated according to a differential bi-phase encoding scheme.

3. The method of claim 1, further comprising:
establishing a wireless coupling between a power transmitter and a power receiver to transfer power to charge a battery of the power receiver, wherein the power receiver comprises the power receiver circuit;

maintaining the wireless coupling during the first operating interval, the first modulation interval, the second operating interval, and the second modulation interval;

receiving the first ASK signal and the second ASK signal by the power transmitter; and adjusting a power level of power transferred from the power transmitter to the power receiver based on the first ASK signal, the second ASK signal or both.

4. The method of claim 1, wherein the power receiver circuit is switched from the first arrangement to the second arrangement by coupling one or more capacitors to the power receiver circuit.

5. The method of claim 1, wherein the power receiver circuit is switched from the second arrangement to the first arrangement by decoupling one or more capacitors from the power receiver circuit.

6. The method of claim 1, wherein the power receiver circuit is switched from the first arrangement to the second arrangement by decoupling one or more capacitors from the power receiver circuit.

7. The method of claim 1, wherein the power receiver circuit is switched from the second arrangement to the first arrangement by coupling one or more capacitors from the power receiver circuit.

8. The method of claim 1, wherein the detecting the voltage comprises detecting the voltage on the power receiver circuit crossing the threshold level while the data transmission between the power receiver circuit and the power transmitter circuit occurs.

9. The method of claim 1, wherein the first time period and the second time period are equal to a bit period of the first ASK signal and a bit period of the second ASK signal, respectively.

10. The method of claim 1, wherein a duration of the first time period is equal to a sum of a first duration of the first operating interval and a second duration of the first modulation interval.

11. A method for modulating a signal comprising:
operating a power receiver circuit in a first arrangement during a first operating interval of a first time period, wherein the first time period comprises the first operating interval and a first modulation interval;

switching the power receiver circuit between the first arrangement and a second arrangement during the first modulation interval of the first time period to vary a load on the power receiver circuit to produce a first amplitude shift keying (ASK) signal, wherein switching the power receiver circuit from the first arrangement to the second arrangement increases a voltage on the power receiver circuit across the load, wherein the first ASK signal is configured to carry a first digital value for reception by a power transmitter circuit;

detecting the voltage on the power receiver circuit exceeding a threshold level;

operating the power receiver circuit in the second arrangement during a second operating interval of a second time period, wherein the second time period comprises the second operating interval and a second modulation interval; and switching the power receiver circuit between the second arrangement and the first arrangement during the second modulation interval of the second time period to vary the load on the power receiver circuit to produce a second ASK signal, wherein switching the power receiver circuit from the second arrangement to the first arrangement decreases the voltage on the power receiver circuit across the load, wherein the second ASK signal is configured to carry a second digital value for reception by the power transmitter circuit, wherein the first time period and the second time period are two adjacent time periods in a plurality of continuous time periods, wherein data transmission between the power receiver circuit and the power transmitter circuit occurs during each of the plurality of continuous time periods.

12. The method of claim 11, further comprising:
establishing a wireless coupling between a power transmitter and a power receiver to transfer power to charge a battery of the power receiver, wherein the power receiver comprises the power receiver circuit;

maintaining the wireless coupling during the first operating interval, the first modulation interval, the second operating interval, and the second modulation interval; and wherein the first ASK signal and the second ASK signal are modulated according to a differential bi-phase encoding scheme.

13. The method of claim 11, wherein the power receiver circuit is switched from the first arrangement to the second arrangement by coupling one or more capacitors to the power receiver circuit.

14. The method of claim 11, wherein the power receiver circuit is switched from the second arrangement to the first arrangement by decoupling one or more capacitors from the power receiver circuit.

15. The method of claim 11, wherein the power receiver circuit is switched from the first arrangement to the second arrangement by decoupling one or more capacitors from the power receiver circuit.

16. The method of claim 11, wherein the power receiver circuit is switched from the second arrangement to the first arrangement by coupling one or more capacitors from the power receiver circuit.

17. The method of claim 11, wherein the detecting the voltage comprises detecting the voltage on the power receiver circuit exceeding the threshold level while the data transmission between the power receiver circuit and the power transmitter circuit occurs.

18. A method for modulating a signal comprising:
operating a power receiver circuit in a first arrangement during a first operating interval of a first time period, wherein the first time period comprises the first operating interval and a first modulation interval;

switching the power receiver circuit between the first arrangement and a second arrangement during the first modulation interval of the first time period to vary a load on the power receiver circuit to produce a first amplitude shift keying (ASK) signal, wherein switching the power receiver circuit from the first arrangement to the second arrangement decreases a voltage on the power receiver circuit across the load, wherein the first ASK signal is configured to carry a first digital value for reception by a power transmitter circuit;

detecting the voltage on the power receiver circuit falling below a threshold level;

operating the power receiver circuit in the second arrangement during a second operating interval of a second time period, wherein the second time period comprises the second operating interval and a second modulation interval; and switching the power receiver circuit between the second arrangement and the first arrangement during the second modulation interval of the second time period to vary the load on the power receiver circuit to produce a second ASK signal, wherein switching the power receiver circuit from the second arrangement to the first arrangement increases the voltage on the power receiver circuit across the load, wherein the second ASK signal is configured to carry a second digital value for reception by the power transmitter circuit, wherein the first time period and the second time period are two adjacent time periods in a plurality of continuous time periods, wherein data transmission between the power receiver circuit and the power transmitter circuit occurs during each of the plurality of continuous time periods.

19. The method of claim 18, further comprising:

establishing a wireless coupling between a power transmitter and a power receiver to transfer power to charge a battery of the power receiver, wherein the power receiver comprises the power receiver circuit;

maintaining the wireless coupling during the first operating interval, the first modulation interval, the second operating interval, and the second modulation interval; and wherein the first ASK signal and the second ASK signal are modulated according to a differential bi-phase encoding scheme.

20. The method of claim 18, wherein the power receiver circuit is switched from the first arrangement to the second arrangement by coupling one or more capacitors to the power receiver circuit.

21. The method of claim 18, wherein the power receiver circuit is switched from the second arrangement to the first arrangement by decoupling one or more capacitors from the power receiver circuit.

22. The method of claim 18, wherein the power receiver circuit is switched from the first arrangement to the second arrangement by decoupling one or more capacitors from the power receiver circuit.

23. The method of claim 18, wherein the power receiver circuit is switched from the second arrangement to the first arrangement by coupling one or more capacitors from the power receiver circuit.

24. The method of claim 18, wherein the detecting the voltage comprises detecting the voltage on the power receiver circuit falling below the threshold level while the data transmission between the power receiver circuit and the power transmitter circuit occurs.

25. The method of claim 18, wherein a duration of the first time period is equal to a sum of a first duration of the first operating interval and a second duration of the first modulation interval.

* * * * *